United States Patent
Richter et al.

(10) Patent No.: US 11,685,000 B2
(45) Date of Patent: Jun. 27, 2023

(54) TOOL ARRANGEMENT AND METHOD FOR ACCOMMODATING AN OPTICAL TOOL IN A PARK POSITION

(71) Applicant: Volkswagen Aktiengesellschaft, Wolfsburg (DE)

(72) Inventors: Stefan Richter, Roetgesbuettel (DE); Sebastian Marx, Vechelde (DE); Mike Hirschfeldt, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 600 days.

(21) Appl. No.: 16/507,786

(22) Filed: Jul. 10, 2019

(65) Prior Publication Data
US 2020/0016693 A1   Jan. 16, 2020

(30) Foreign Application Priority Data
Jul. 10, 2018 (DE) ................. 10 2018 211 423.4

(51) Int. Cl.
*B23K 26/142* (2014.01)
*B23K 26/03* (2006.01)
(Continued)

(52) U.S. Cl.
CPC .......... *B23K 26/142* (2015.10); *B23K 26/032* (2013.01); *B25F 5/02* (2013.01); *G01N 21/15* (2013.01); *G01N 2021/151* (2013.01)

(58) Field of Classification Search
None
See application file for complete search history.

(56) References Cited

U.S. PATENT DOCUMENTS 9,358,636 B2    6/2016  Hammann et al.
2006/0044562 A1*  3/2006  Hagene et al. ........ G01N 21/17
                                                                356/437
(Continued)

FOREIGN PATENT DOCUMENTS

DE    3630127 A1   3/1987
DE    10013461 A1  9/2001
(Continued)

OTHER PUBLICATIONS

Rouchouze, B. (Aug. 15, 2016). How to design with Inflatable Seals. Today's Medical Developments. Retrieved Sep. 15, 2022, from https://www.todaysmedicaldevelopments.com/article/how-to-design-with-inflatable-seals/ (Year: 2016).*

*Primary Examiner* — Brian W Jennison
*Assistant Examiner* — Kevin Guanhua Wen
(74) *Attorney, Agent, or Firm* — Muncy, Geissler, Olds & Lowe, P.C.

(57) ABSTRACT

A tool arrangement is provided for accommodating portions of an optical tool in a park position, having an optical tool and having a housing with an opening suitable for accommodating portions of the optical tool in a housing interior, with a housing discharge connected to the housing in a fluid-conducting manner, and with a sealing sleeve arranged at the opening of the housing, wherein the sealing sleeve has a fluid-carrying line for adapting a variable fill volume of the sealing sleeve. In addition, a method is provided for accommodating portions of an optical tool in a park position.

12 Claims, 2 Drawing Sheets

(51) Int. Cl.
B25F 5/02 (2006.01)
G01N 21/15 (2006.01)

(56) References Cited

U.S. PATENT DOCUMENTS

| | | | |
|---|---|---|---|
| 2010/0199448 A1 * | 8/2010 | Vazales et al. | B08B 9/04 |
| | | | 15/104.05 |
| 2013/0326965 A1 | 12/2013 | Darzi | |
| 2018/0111193 A1 | 4/2018 | Romano et al. | |
| 2018/0147611 A1 * | 5/2018 | Carson | B08B 3/12 |

FOREIGN PATENT DOCUMENTS

| | | | |
|---|---|---|---|
| DE | 202005008564 U1 | 8/2005 | |
| DE | 102006052292 A1 | 5/2008 | |
| DE | 102013209654 A1 | 12/2013 | |
| DE | 102016213075 A1 | 1/2018 | |
| EP | 3308803 A1 * | 4/2018 | A61L 2/07 |
| WO | WO2009152836 A1 | 12/2009 | |
| WO | WO 2014111498 A1 * | 7/2014 | G01N 21/15 |
| WO | WO2016015922 A1 | 2/2016 | |
| WO | WO 2016058105 A1 * | 4/2016 | B08B 3/04 |

* cited by examiner

TOOL ARRANGEMENT AND METHOD FOR ACCOMMODATING AN OPTICAL TOOL IN A PARK POSITION

This nonprovisional application claims priority under 35 U.S.C. § 119(a) to German Patent Application No. 10 2018 211 423.4, which was filed in Germany on Jul. 10, 2018, and which is herein incorporated by reference.

BACKGROUND OF THE INVENTION

Field of the Invention

The present invention relates to a tool arrangement for accommodating portions of an optical tool in a park position, having an optical tool and having a housing with an opening suitable for accommodating portions of the optical tool in a housing interior, with a fluid-conducting housing discharge connected to the housing, and with a sealing sleeve arranged at the opening of the housing, and also relates to a method for accommodating portions of an optical tool in a park position.

Description of the Background Art

Laser cutting systems are used in various technical areas, and can be distinguished by precision and automation capabilities. In addition to a controller, such laser cutting systems usually have a mechanism for aligning a tool section relative to a workpiece. Tool sections can be, for example, laser internal machining tools, which have a mirror head at the end for deflecting and focusing a laser beam.

The laser optics in the mirror head on the laser internal machining tool are susceptible to contaminants. When contaminants get into a laser exit aperture in the mirror head, the contaminants can deflect the laser beam and cause quality problems in machining of the workpiece and cause damage to the mirror head or the tool section.

When a laser cutting system is stopped, either compressed air or nitrogen is continuously passed out of the laser exit aperture. In this way, it is possible to prevent contaminants from getting into the mirror head.

Compressed air usually is not sufficiently clean, with the result that new contaminants can get into the laser optics or the laser exit aperture through the flow of compressed air alone. In addition, the option is known of passing nitrogen out through the laser exit aperture. Nitrogen is used as process gas, and is available even in the case of a system shutdown. However, when nitrogen is flowing out it is necessary for the system exhaust to be in operation, since otherwise there is a life-threatening hazard for persons in the vicinity of the laser cutting system. It is problematic in this context that the system exhaust must be continuously in operation even during relatively long downtimes, as for example a vacation closure of the facility.

Another possible solution that is known is manual taping of the laser exit aperture by a worker. However, it is problematic here that this method cannot be carried out reliably in a production process with frequent, brief downtimes.

SUMMARY OF THE INVENTION

It is therefore an object of the present invention to create a tool arrangement and a method for cost-effective, safe, and automatable storage of a tool section in a park position.

According to an exemplary embodiment of the invention, a tool arrangement is provided for accommodating portions of an optical tool in a park position. The tool arrangement has an optical tool and a housing. Incorporated in the housing is an opening that is suitable for accommodating at least portions of the optical tool in a housing interior. In addition, the housing has a housing discharge that is connected to the housing interior in a fluid-conducting manner. Arranged at the opening of the housing is a sealing sleeve, wherein the sealing sleeve has a fluid-carrying line for adapting a variable fill volume of the sealing sleeve.

In this way, a station can be provided for accommodating a tool section or for accommodating portions of the optical tool. The housing is preferably arranged to be stationary. If the optical tool is not needed, it can be moved automatically or manually to the housing. In particular, the position of the housing opening and the insertion depth of the tool section in the opening can be known to the tool or to a tool controller for this purpose.

The optical tool can preferably be a laser cutting system that has a laser lance that is movable in a defined manner with a mirror head at its end. The laser cutting system can be implemented as a laser internal machining tool, in particular.

Also, additional devices and mechanisms can be arranged in the housing. For example, a device for carrying out laser power measurements can be integrated into the housing or be connected to the housing.

The laser lance with a mirror head or tool section that is inserted through the opening into the housing interior can be sealed by means of an "inflatable sealing sleeve." The sealing sleeve is arranged in the region of the opening of the housing and can automatically change its volume in order to adapt an air gap between an edge of the opening and the tool section. In a park position of the optical tool, an air gap can be eliminated by means of the sealing sleeve, and thus a gastight seal can be achieved between the tool section and the housing. For removing or inserting the tool section in the housing interior, a defined air gap can be set by reducing the fill volume of the sealing sleeve. The sealing sleeve is preferably connected to a fluid line by a manually or automatically operated valve. The fluid line can provide compressed air or nitrogen, for example. In this way, the fill volume of the sealing sleeve can be filled with gases that normally are already on hand. Alternatively, the fill volume of the sealing sleeve can be filled with a liquid, as for example water or an oil.

In the park position of the optical tool, the housing space can be closed off in a gastight manner by the sealing sleeve. Air and any contaminants can be forced out of the housing interior by flooding the housing interior with, for example, nitrogen. The air can escape through the housing discharge or be drawn off with the generation of a negative pressure. The housing discharge can be coupled in a fluid-conducting manner to a separate exhaust or to a system exhaust on the tool side.

After a defined period of time or after a defined nitrogen concentration has been reached, the supply of the gas can be stopped and the exhaust outlet can be closed. Consequently, the optical tool, as for example a laser optics unit with a sensitive laser exit aperture, can remain in a cleaned and sealed space. Other gases can also be used to flood the housing interior or to set a fill volume of the sealing sleeve. For example, helium, pure oxygen, argon, and the like can also be used.

A housing of this nature can automatically accommodate a tool section with a sensitive mirror head without costs for consumables. In this way, an option for storing a tool section can be achieved that is economical and provides process reliability. No hazardous gases flow into an environment of the optical tool during relatively long downtimes due to the arrangement according to the invention. In this case, the system exhaust of the optical tool can be turned off.

The optical tool can be arranged optimally in the housing interior and then hermetically sealed if a space between an edge of the opening of the housing and the partially accommodated optical tool can be sealed by the sealing sleeve.

A change in the fill volume of the sealing sleeve can be implemented efficiently and with low energy expenditure by means of a sealing sleeve made of a flexible material. In particular, a sealing sleeve of this nature can accommodate differently designed tool sections and compensate for varying air gaps between the tool section and the edge of the opening.

The housing can be produced in a way that is economical and technically especially simple when the opening of the housing is round in design and the sealing sleeve is arranged along the circumference of the round opening of the housing.

Contaminants in the housing interior can be removed effectively when a fluid for maintaining a degree of cleanliness in the housing interior can be introduced into the housing interior from a fluid supply of the optical tool and/or through a housing supply line.

The tool arrangement can have a power meter, which is arranged in the housing to monitor a function of the optical tool. By this means, an additional test station for monitoring the laser power of the optical tool can be provided in addition to an option for storing portions of the optical tool. For example, a laser power measurement can be carried out before the optical tool is placed back in service. Alternatively, a laser power measurement can be carried out before storage or parking of the optical tool in the housing. In the event that the laser power measurement has been completed and the tool section or the laser lance must remain in the park position, nitrogen continues to flow out until the housing interior is flooded and dirt particles are drawn off through the housing discharge.

The laser power measurement can be carried out reliably and in a technically simple way when a deviation of an actual value of the optical tool from a target value can be measured by the power meter.

The power meter can have a control unit for performing evaluations and for obtaining instructions for use of the optical tool. In this way, the tool arrangement can provide additional instructions and functions with the power meter. In the event of a detection of a deviation of the target specification from a measured actual value of a power of the optical tool, an instruction can be visually displayed in the controller or output to a user. For example, a message "Unscrew the mirror head" can be generated by the control unit. The control unit can also detect whether the mirror head is unscrewed or has been replaced, and can then carry out an additional measurement. Fault analysis can be simplified in this way. In particular, a location of the contamination can be determined by means of the power meter. If the deviation of the actual value from the target value was corrected after replacement of the mirror head, then contamination or impairment was present in the region of the mirror head of the optical tool. If the actual value should continue to deviate from the target value, then contamination or impairment of the optical path is present in a different region of the optical tool.

A method is also provided for accommodating portions of an optical tool in a park position. In one step, a portion of an optical tool is placed in a housing interior through an opening of a housing. Then a variable-volume sealing sleeve located at an edge of the opening of the housing is filled until a space between the tool partially located in the opening and the edge of the opening of the housing is filled in a fluid-tight manner. After the sealing of the opening by the sealing sleeve, a purge gas is introduced into the housing interior through a supply line located in the optical tool and/or the housing until a target concentration of the purge gas in the housing interior is achieved or a time interval has passed.

A safe, fully automatic, and inexpensive solution for storage of an optical tool can be implemented by means of the method according to the invention. The sensitive areas of the optical tool, as for example a mirror head, can thus be protected efficiently from contaminants. In particular, a consumption of a purge gas can be minimized, and during a stoppage of the optical tool, an exhaust system of the tool can be deactivated or operated at reduced power.

For example, a housing can be provided as a park position for each optical tool. Alternatively, multiple optical tools can also share a housing with one another, wherein an appropriate housing can have multiple openings with sealing sleeves for accommodating tool sections of different optical tools. Every optical laser head can be protected from contaminants using this unit, for example. Alternatively, it is also possible to dispense with a laser power measurement and to provide only a parking station for the mirror head. The mirror head can also be a prism head. Here, a prism is used instead of a mirror as optical deflection.

The tool section can be stored in the housing interior especially reliably, even in the event of long downtimes, if a pressure in the housing interior is checked at intervals by a power meter or by a housing sensor and is set by a supply of purge gas. By this means it is possible to prevent any contaminated air from entering the housing interior. In particular, a slight positive pressure in the housing interior relative to an environment of the optical tool can be set in order to actively prevent an entry of contaminants.

The optical tool can be operated from a park position in an especially well-protected and safe manner if, upon a reactivation of the optical tool from the park position into an active position, the purge gas present in the housing interior is removed through a housing discharge that is connected in a fluid-conducting manner to the housing. In particular, an uncontrolled escape of the purge gas into an environment of the optical tool and a resultant hazard to persons can be prevented.

So that the tool section located in the housing interior can be removed without damage, the fill volume of the variable-volume sealing sleeve is reduced upon the reactivation of the optical tool from the park position into an active position. By relieving the sealing sleeve, an air gap is produced between the edge of the opening and the tool section, and this air gap facilitates a removal of the tool section.

According to an exemplary embodiment of the method, a power measurement of the optical tool is performed by a power meter before the reactivation of the optical tool. In this way, optimal functional performance of the optical tool can be ensured prior to a placement in service.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
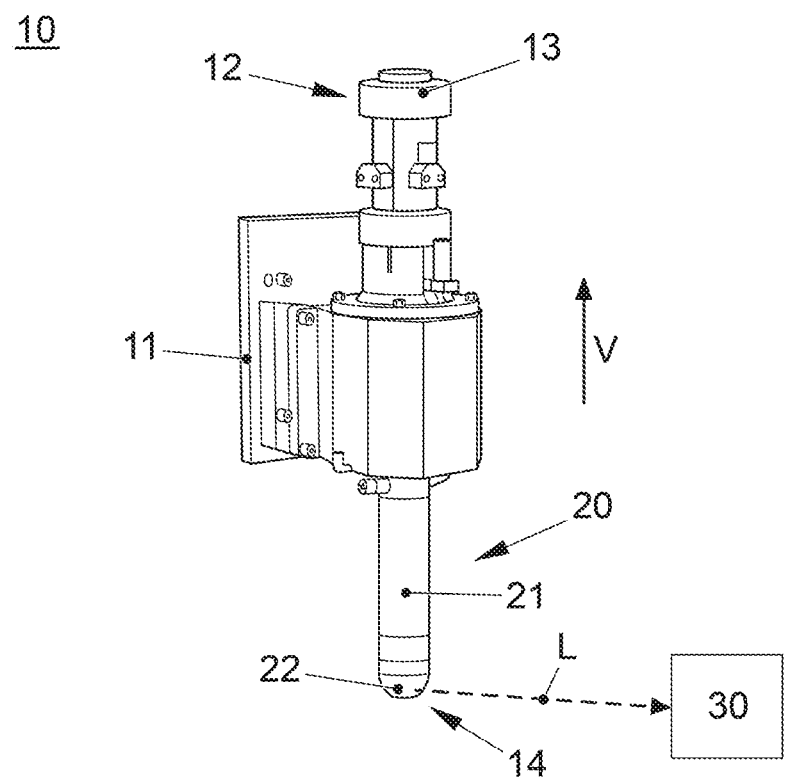
FIG. 1 is a perspective representation of an optical tool.

FIG. 1 shows an optical tool 10 in a perspective representation. According to the exemplary embodiment, the optical tool 10 is implemented as a laser internal machining tool 10.

The optical tool 10 is arranged on a mounting plate 11 that is movable in a defined manner, and is elongated in design. Arranged at an upper end 12 of the optical tool 10 in the vertical direction V is a mounting device 13 for a laser.

A tool section 20 is arranged at a lower end 14 of the optical tool 10 in the vertical direction V. The tool section 20 has a replaceable nozzle 21 and a mirror head 22 located at the end on the nozzle 21 or on a laser lance 21. The nozzle 21 is cylindrical in shape and has an external contour that transitions seamlessly into a contour of the mirror head 22.

A laser beam L coupled into the optical tool 10 from an upper end 12 can be directed through the nozzle 21 into the mirror head 22. In the mirror head 22, the laser beam L that is coupled in can then be directed onto a workpiece 30 for machining the workpiece 30.

Figure 2:
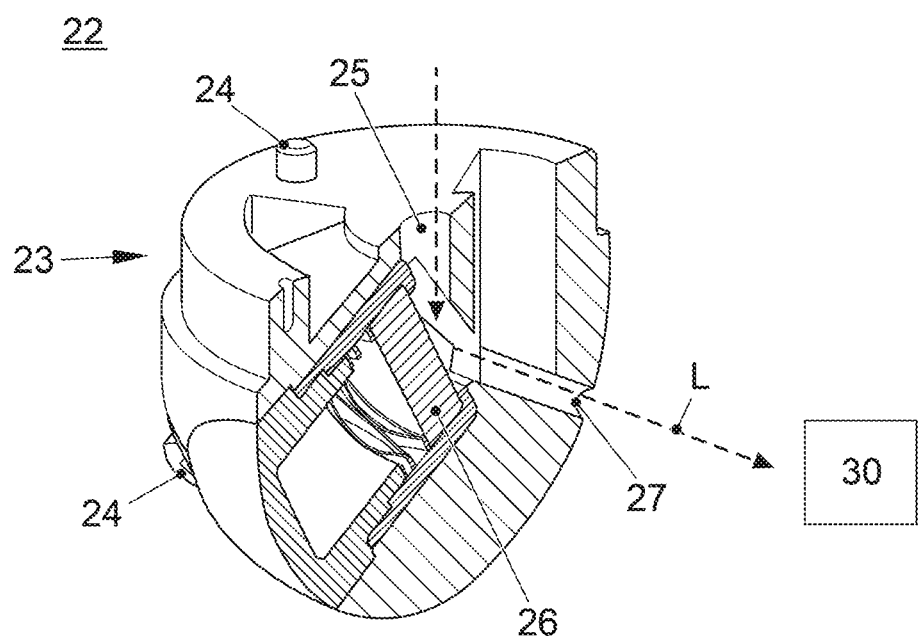
FIG. 2 is a cross-sectional representation of a mirror head of the optical tool.

In FIG. 2, a cross-sectional representation is shown of a mirror head 22 of the optical tool 10 or of the tool section 20.

The mirror head 22 has a cylindrically shaped connecting region 23 for interlocking attachment of the mirror head 22 to the nozzle 21. The mirror head 22 can preferably be connected by a screw 24 to the replaceable nozzle 21.

In the connecting region 23, a laser entrance aperture 25 is arranged in the mirror head 22. A laser beam L can be directed through the laser entrance aperture 25 onto a replaceable mirror 26 and deflected in the direction of a laser exit aperture 27. The arrows illustrate the beam path of the laser. Dirt particles can get into the mirror head 22 through the laser exit aperture 27 and impair a propagation of a laser beam L.

According to the exemplary embodiment, nitrogen can be passed out through the laser exit aperture 27 in order to prevent an ingress of dirt particles.

Figure 3:
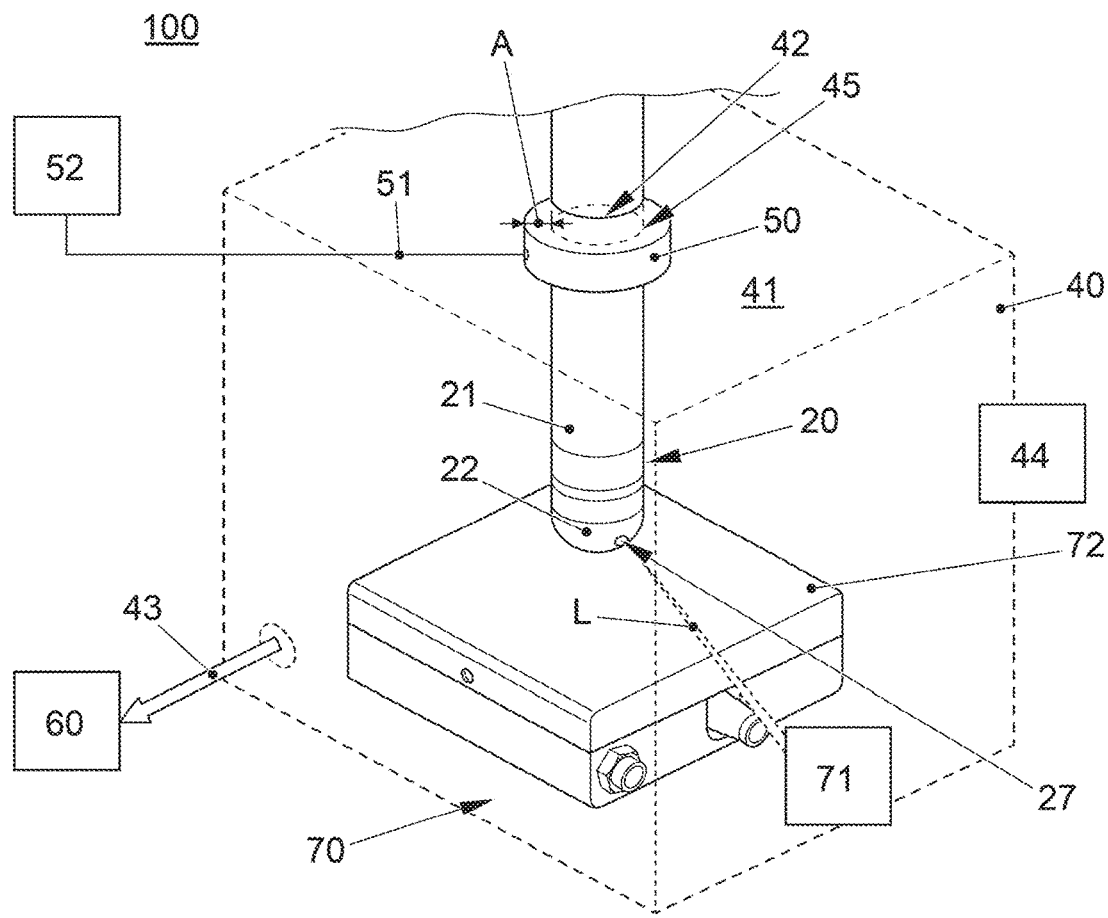
FIG. 3 is a perspective representation of a tool arrangement in a park position according to an embodiment of the invention.

FIG. 3 shows a perspective representation of a tool arrangement 100 with an optical tool 10 in a park position according to one embodiment of the invention.

The tool arrangement 100 has a housing 40 with a housing interior 41. The housing 40 serves as a completely sealable enclosure for the tool section 20. An opening 42 is incorporated in one region of the housing 40. Arranged at an edge 45 of the opening 42 is a sealing sleeve 50. When in a park position, at least portions of the tool section 20 project through the opening 42 into the housing interior 41.

The sealing sleeve 50 completely covers the edge 45 of the opening 42 and is inflatable in design. For this purpose, the sealing sleeve 50 is connected by a fluid-carrying line 51 to a fluid provision system 52. The sealing sleeve 50 can thus be filled with a fluid or emptied as needed. In the exemplary embodiment shown, the sealing sleeve 50 is filled with the fluid, by which means the housing 40 is hermetically sealed in the region of the opening 42.

In addition, the housing 40 has a housing discharge 43, which is coupled to the housing interior 41 in a fluid-conducting manner. The housing discharge 43 is connected to a system exhaust 60, by which means a negative pressure can be applied as needed to the housing discharge 43 in order to remove dirty air.

The housing interior 41 can be filled with nitrogen through the laser exit aperture 27. In this way, optimal boundary conditions can be created for storage of the mirror head 22 that prevent contamination of the mirror head 22. A sensor 44 for measuring a nitrogen concentration is attached to the housing 40 for the purpose of determining an optimal fill level of the housing interior 41 and controlling a nitrogen supply through the laser exit aperture 27.

Also located in the housing 40 is a power meter 70. The power meter 70 is designed here as a laser power measuring device with a measuring head 71 for detecting a radiated power of the laser beam L. For example, the measuring head 71 can be a thermal measuring probe. The measuring head 71 is connected to a control unit 72 of the power meter 70 and can be evaluated by the control unit 72. In particular, a power measurement can be performed before a removal of the tool section 20 from the housing 40 or shortly after a positioning of the tool section 20 in the housing 40.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A tool arrangement to accommodate portions-of an optical tool in a park position, the arrangement comprising:
   an optical tool;
   a housing having a housing interior that accommodates only a portion of the optical tool therein to be placed in a park position for storing and cleaning, the portion of the optical tool extending into the housing interior through an opening of the housing;
   a housing discharge connected to the housing in a fluid-conducting manner; and
   a sealing sleeve arranged at the opening of the housing, the sealing sleeve being inflatable and having a fluid-carrying line for adapting a variable fill volume of the sealing sleeve so as to seal and unseal the opening of the housing.

2. The tool arrangement according to claim 1, wherein the sealing sleeve is made of a flexible material, wherein a space between an edge of the opening of the housing and art outer surface of the optical tool provided at the opening is sealed by adapting the variable fill volume of the sealing sleeve so as to inflate the sealing sleeve, and wherein the space is unsealed by adapting the variable fill volume of the sealing sleeve so as to deflate the sealing sleeve.

3. The tool arrangement according to claim 1, wherein the opening of the housing is round and the sealing sleeve is arranged along a circumference of the round opening of the housing.

4. The tool arrangement according to claim 1, wherein a fluid for maintaining a degree of cleanliness in the housing interior is introduced into the housing interior from a fluid supply of the optical tool and/or through a housing supply line.

5. The tool arrangement according to claim 1, further comprising a power meter, which is arranged in the housing to monitor a function of the optical tool, and wherein a deviation of an actual value of the optical tool from a target value is measured by the power meter.

6. The tool arrangement according to claim 5, wherein the power meter has a control unit for performing evaluations and for obtaining instructions for use of the optical tool.

7. A method for accommodating portions of an optical tool in a park position, the method comprising:
   placing only a portion of an optical tool in a housing interior of a housing through an opening of the housing so that the portion of the optical tool is placed in a park position for storing and cleaning;
   filling an inflatable variable-volume sealing sleeve located at an edge of the opening of the housing until a space between an outer surface of the optical tool located in the opening and the edge of the opening of the housing is sealed in a fluid-tight manner; and
   introducing a purge gas into the housing interior through a supply line located in the optical tool and/or the housing until a target concentration of the purge gas in the housing interior is achieved or a time interval has passed in order to clean the portion of the optical tool.

8. The method according to claim 7, wherein a pressure in the housing interior is checked at intervals by a power meter or by a housing sensor and is set by a supply of the purge gas.

9. The method according to claim 7, wherein, upon a reactivation of the optical tool from the park position into an active position, the purge gas present in the housing interior is removed through a housing discharge that is connected in a fluid-conducting manner to the housing, wherein a fill volume of the variable-volume sealing sleeve is reduced upon the reactivation of the optical tool from the park position into the active position.

10. The method according to claim 7, wherein a power measurement of the optical tool is performed by a power meter before a reactivation of the optical tool.

11. The tool arrangement according to claim 1, wherein the portion of the optical tool is not always maintained in the housing.

12. The method according to claim 7, wherein the portion of the optical tool is not always maintained in the housing.

* * * * *